March 24, 1959  E. LE ROY FRANCE ET AL  2,878,883
VEHICLE AND STEERABLE ENDLESS TREAD THEREFOR
Filed March 28, 1956  9 Sheets-Sheet 1
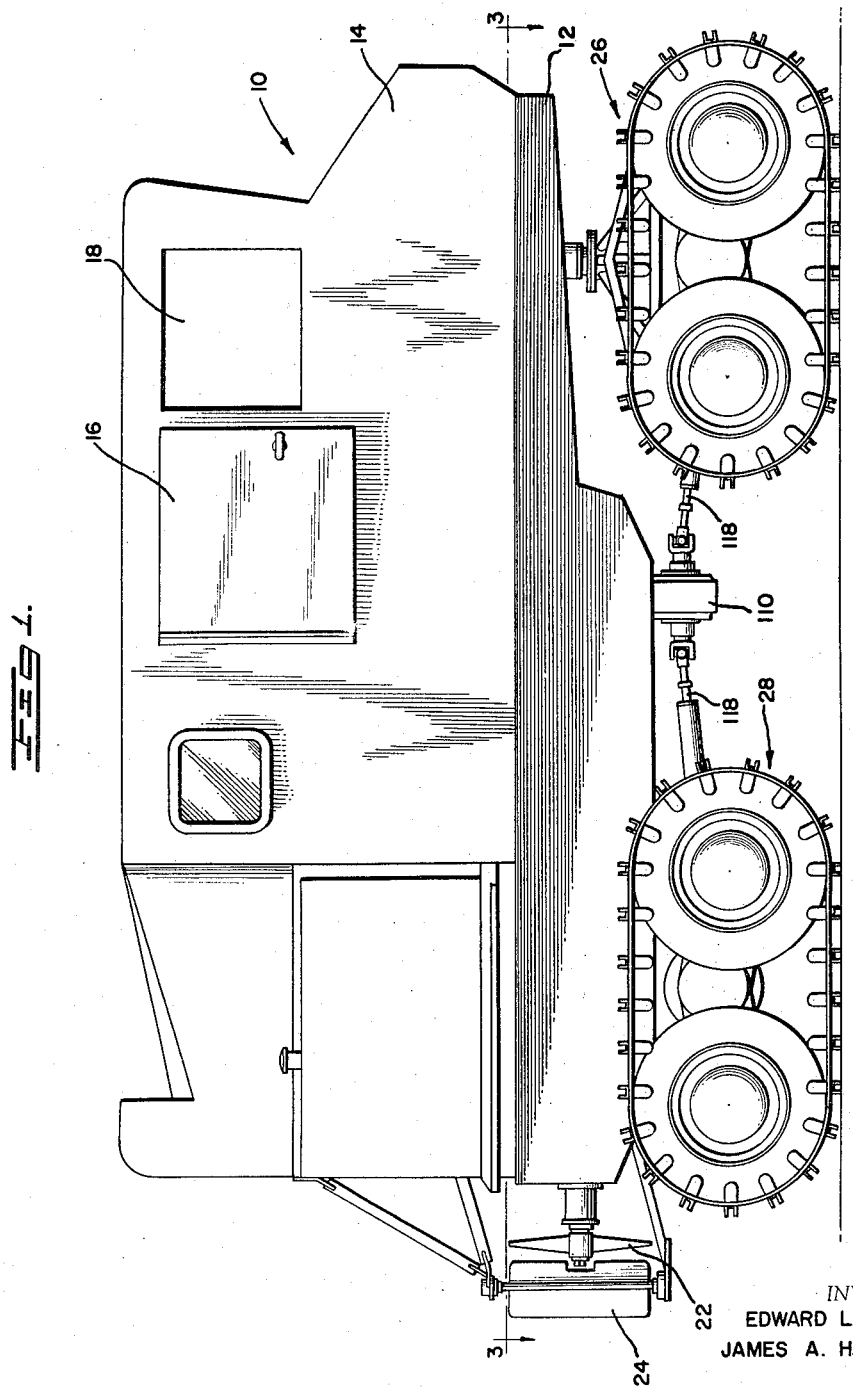
INVENTORS
EDWARD L. FRANCE
JAMES A. HARDMAN
BY Harold T. Stowell
ATTORNEY

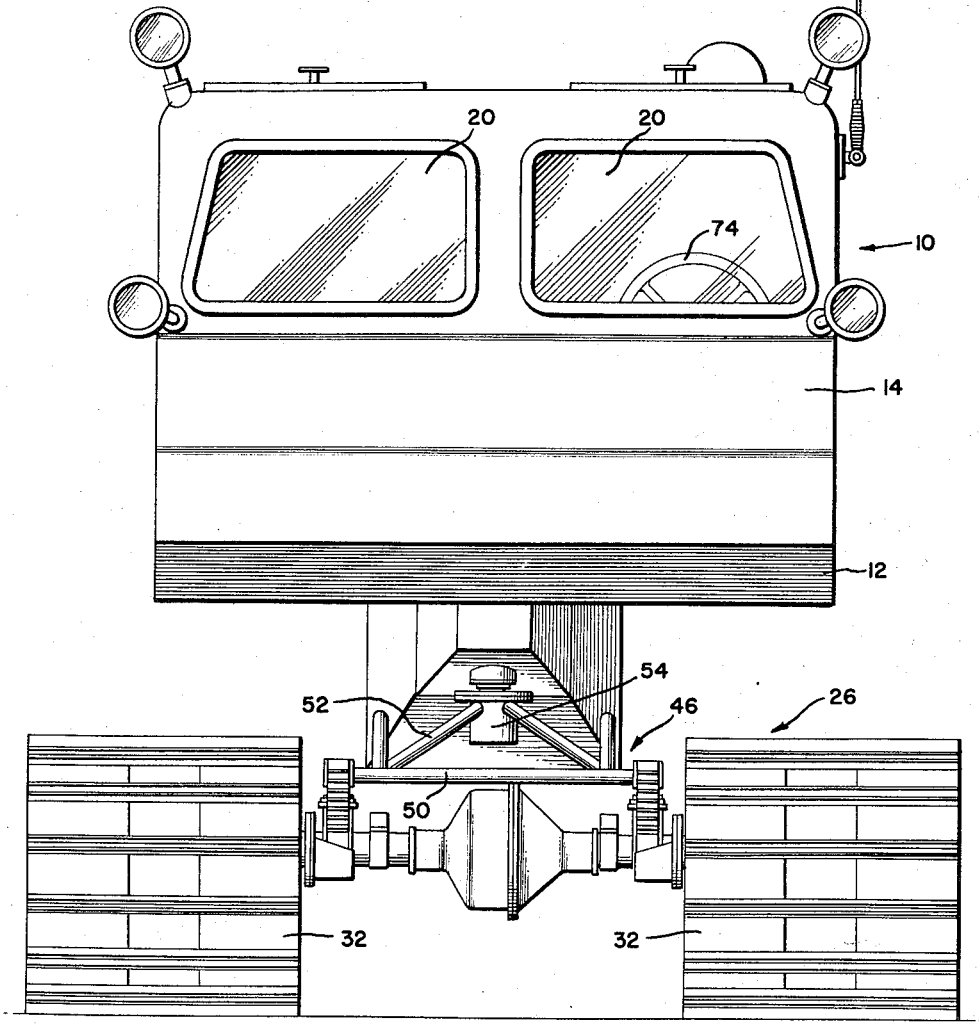

March 24, 1959    E. LE ROY FRANCE ET AL    2,878,883
VEHICLE AND STEERABLE ENDLESS TREAD THEREFOR
Filed March 28, 1956            9 Sheets-Sheet 3
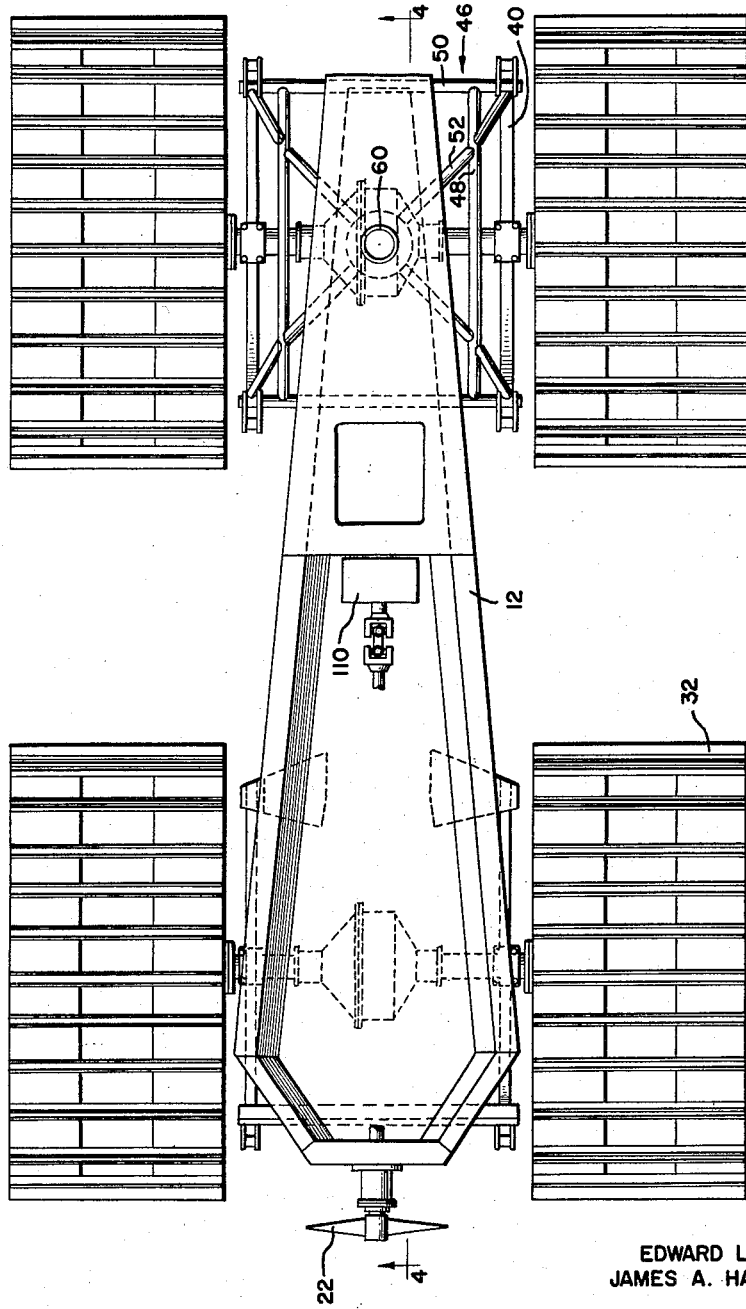
INVENTORS
EDWARD L. FRANCE
JAMES A. HARDMAN
BY *Harold T. Stowell*
ATTORNEY

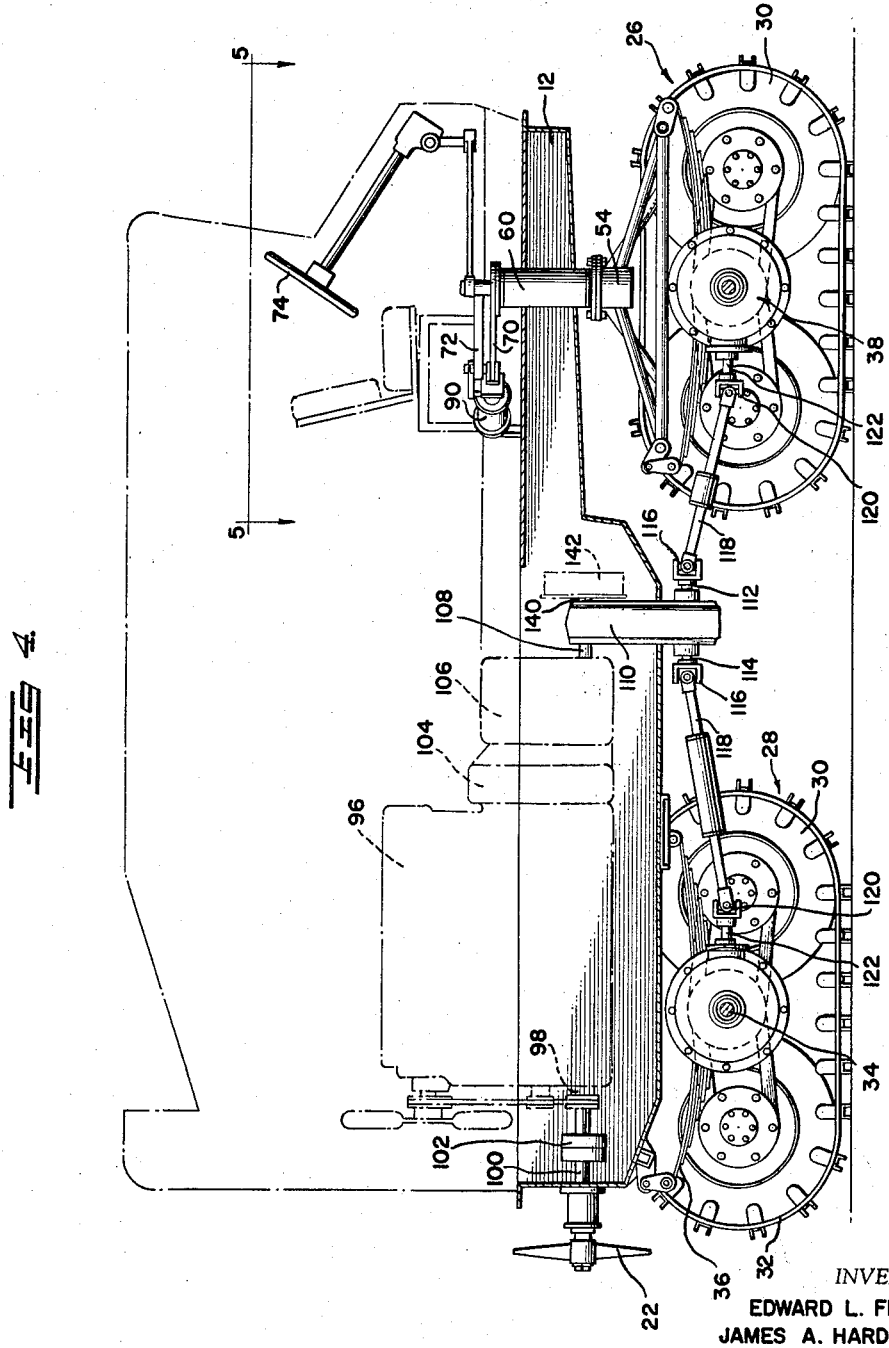

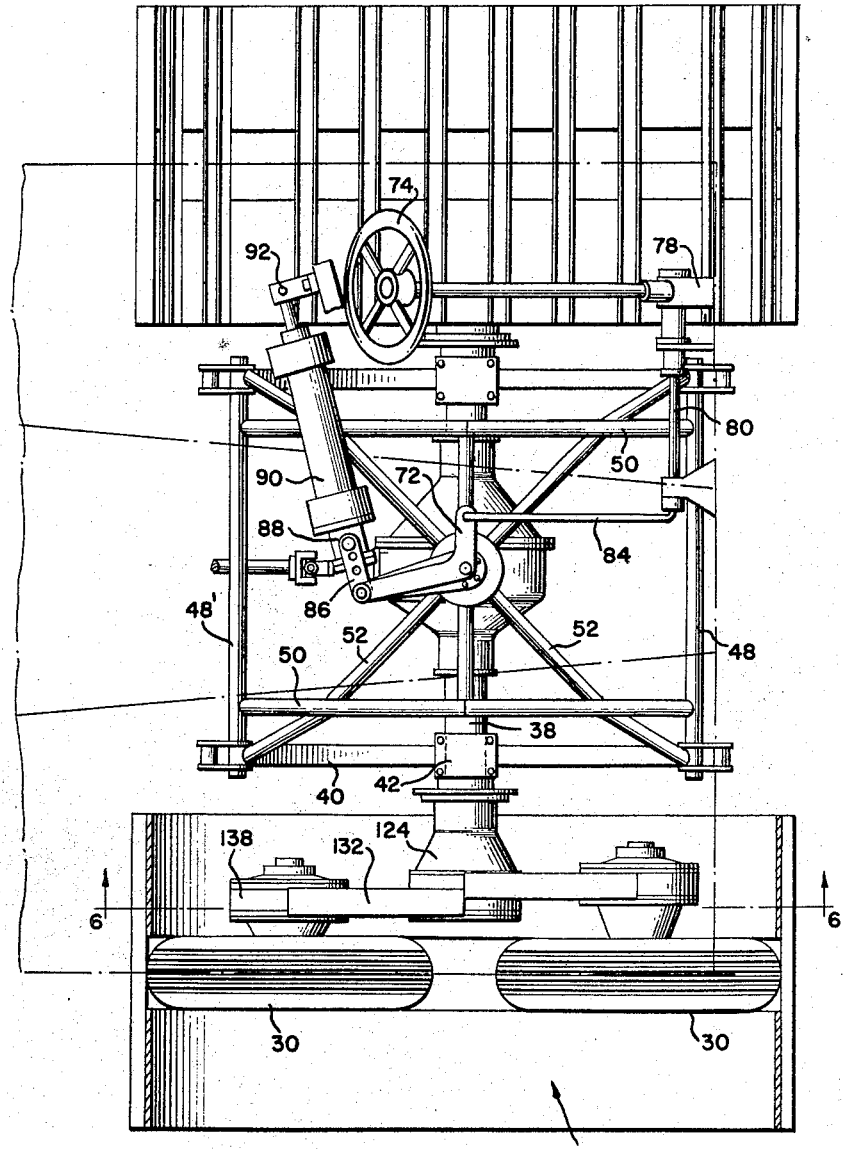

March 24, 1959     E. LE ROY FRANCE ET AL     2,878,883
VEHICLE AND STEERABLE ENDLESS TREAD THEREFOR
Filed March 28, 1956                                            9 Sheets-Sheet 6
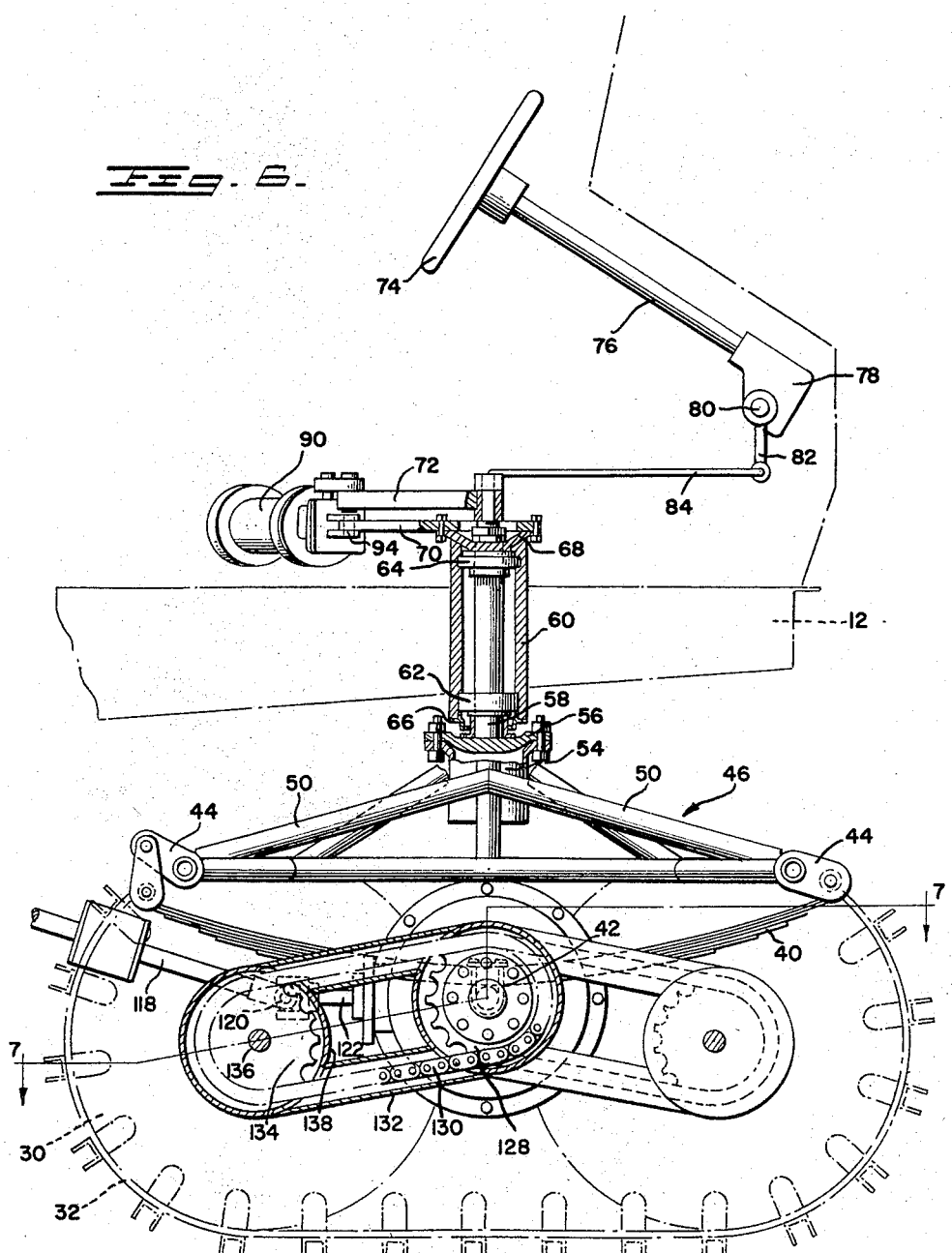
INVENTORS
EDWARD L. FRANCE
JAMES A. HARDMAN
BY Harold T. Stowell
ATTORNEY

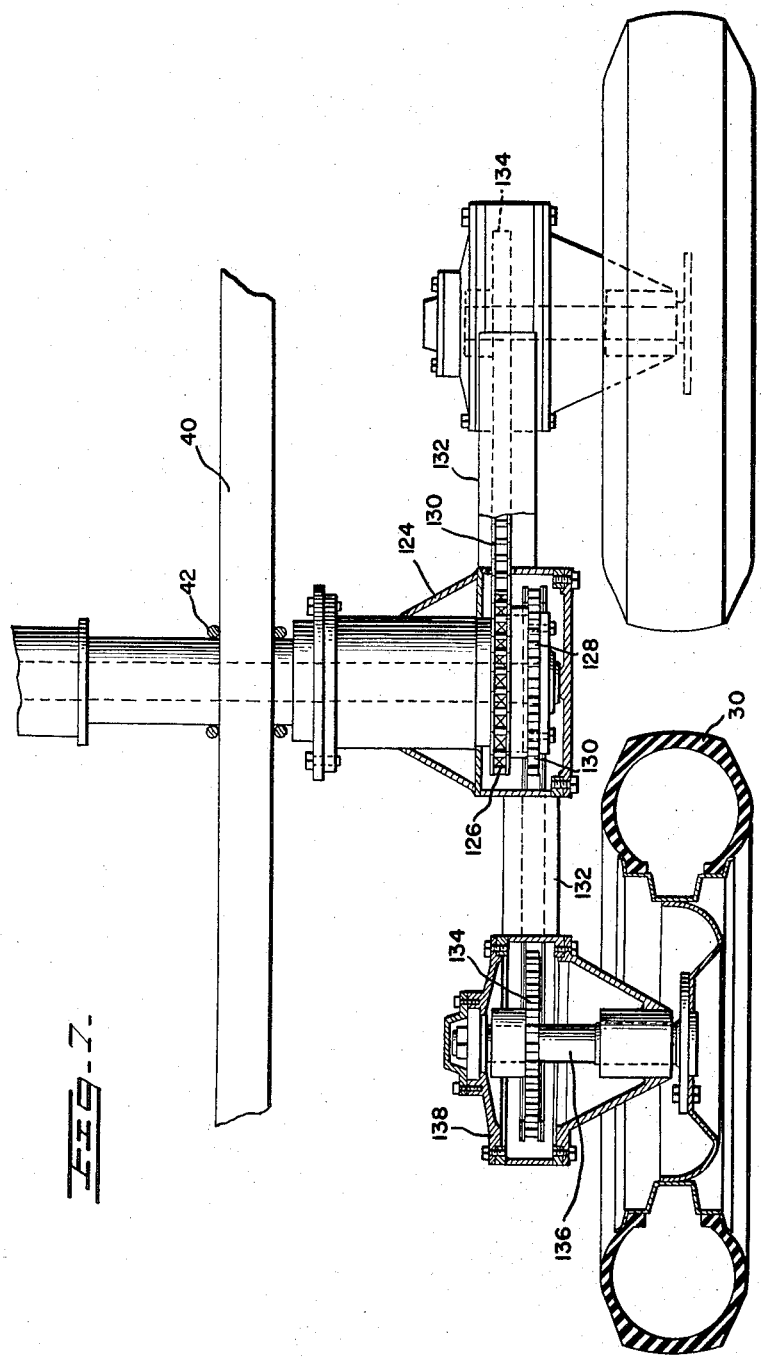

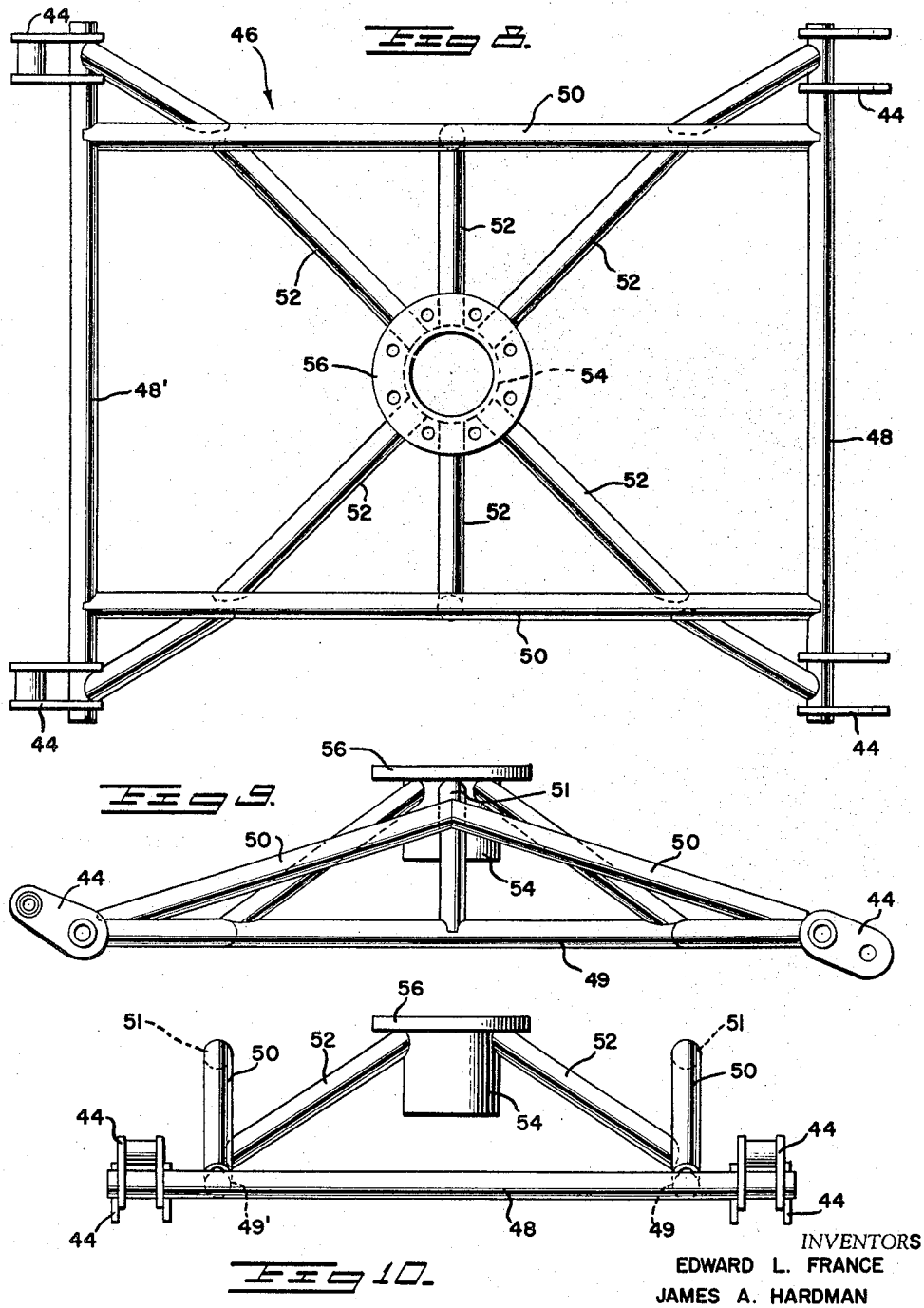

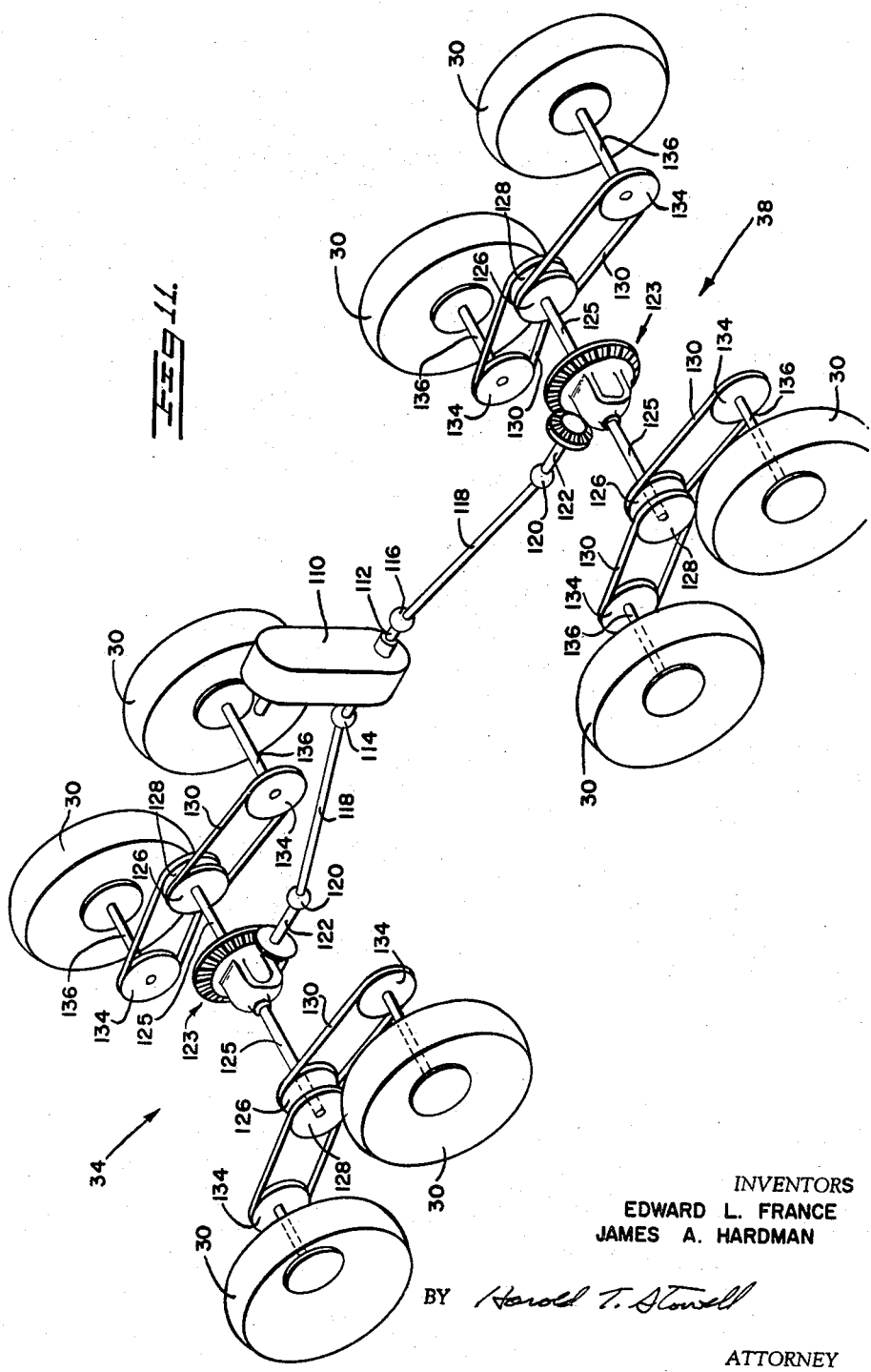

United States Patent Office 2,878,883
Patented Mar. 24, 1959

2,878,883

VEHICLE AND STEERABLE ENDLESS TREAD THEREFOR

Edward Le Roy France and James Abraham Hardman, Logan, Utah, assignors to Utah Scientific Research Foundation, Logan, Utah, a corporation of Utah Application March 28, 1956, Serial No. 574,515

3 Claims. (Cl. 180—9.1)

The present invention relates to a new and useful amphibious vehicle and more particularly and specifically to new and useful improvements in the steering and drive mechanisms for the land engaging traction members of such a vehicle.

It is a general object of this invention to provide an improved and useful amphibious vehicle which includes a hull-like body provided with a power driven propeller and a steering rudder for marine use of the vehicle together with power driven, steerable ground engaging traction members for use of the vehicle on land.

Another object of this invention is the provision of front and rear ground engaging traction assemblies beneath said amphibious vehicle which include plural, endless ground engaging tracks which provide driving traction for the vehicle wherein the forwardmost traction assembly is steerable from within the vehicle to provide directional control of the movement of the vehicle.

Still another object is the provision of new and improved traction assembly mounting construction and associated steering apparatus therefor for control of the directional movement of the vehicle on land.

A still further object and advantage of this invention lies in the provision of power steering apparatus for the forwardmost ground engaging traction assemblies of the vehicle.

Still a further object of this invention relates to the provision of a new and improved drive assembly for the endless traction treads or tracks of such a vehicle.

A still further object and advantage of this invention is the provision of a new and improved amphibious vehicle which is of extremely simple and inexpensive design and construction and which is durable and lasting over heavy, extended use.

Another object and advantage of the present invention is the provision of unique and improved steering assemblies for traction treads or tracks of a vehicle particularly adapted for use in snow and wet or rough terrain wherein the directional control of the vehicle movement is substantially improved over prior conventional vehicles utilized for the same general purposes.

Still further objects and advantages of this invention will become more readily apparent to those skilled in the art when the general statement and description following hereinafter are read in the light of the appended drawings.

The nature of the present invention may be stated in general terms as relating to an amphibious vehicle which includes a buoyant vehicle body, marine propulsion and steering assemblies, front and rear supported ground engaging traction assemblies, power means operably connected to said front and rear traction assemblies, said front traction assemblies being mounted for horizontal pivotal movement beneath said body, manual sterring apparatus within the body, and power steering apparatus operably interconnecting said manual steering apparatus in the vehicle with the front traction assemblies.

Referring now to the accompanying drawings in which like designations refer to similar parts throughout the several views:

Fig. 1 is a side elevation of the improved amphibious vehicle.

Fig. 2 is a front elevation of the vehicle shown in Fig. 1.

Fig. 3 is a horizontal sectional view taken on line 3—3, Fig. 1.

Fig. 4 is a vertical sectional view taken on line 4—4, Fig. 3.

Fig. 5 is a fragmentary plan view taken from line 5—5, Fig. 4.

Fig. 6 is a vertical sectional view taken on line 6—6, Fig. 5.

Fig. 7 is a staggered horizontal sectional view taken on line 7—7, Fig. 6

Fig. 8 is a top plan view of the front spider.

Fig. 9 is a side elevation of the spider shown in Fig. 8.

Fig. 10 is an end elevation of the spider shown in Figs. 8 and 9.

Fig. 11 is a diagrammatic view of the drive arrangement for the vehicle.

The general construction of the new and improved amphibious vehicle constituting the present invention is disclosed principally in Figs. 1 through 4 of the drawings wherein it may be seen that the vehicle, generally designated at 10, includes a buoyant water-tight hull 12 having superimposed thereon an enclosing vehicle cab 14 which includes side entry doors 16, side windows 18, front windshields 20 and other similar vehicle appurtenances.

Supported outwardly of the rearward end of the vehicle in a complementary horizontal plan with the hull portion 12 thereof is a propeller 22 and a steering rudder 24. Located beneath the hull portion 12 of the vehicle are front and rear traction assemblies 26 and 28 respectively which serve to provide ground engagement for moving the vehicle over rough terrain. The drive assembly for the land and marine propulsion members of the vehicle, as well as the steering assemblies for the ground engaging traction members of the vehicle, will be described in detail hereinafter.

Steering apparatus

The support construction for the ground engaging traction assemblies 26 and 28 and the steering assembly for the forwardmost ground engaging traction members 26 are best illustrated in Figs. 4 through 6 of the drawings. The traction assemblies, both front and rear, consist of two sets of paired wheels 30 located in spaced apart relationship laterally of the vehicle with the wheels in each pair being aligned front and rear longitudinally of the vehicle in closely spaced relationship so as to permit an endless ground engaging track 32 to be trained about the peripheries of the wheels in a manner heretobefore well known in the art. The two pairs of wheels spaced laterally beneath the rearward end of the vehicle and constituting the rearmost traction assembly are interconnected by an axle assembly 34 which in turn is supported by leaf springs 36 suspended from the underside of the hull portion 12 of the vehicle body in a manner well known in the art. The axle assembly 34 thus serves to rigidly locate and support the two sets of paired wheels constituting the rear traction assembly and provides a medium for transmission of power to these wheels in manners to be hereinafter described.

The forwardmost traction assembly 26 is similar to assembly 28 above described in that it consists of two sets of paired wheels 30 spaced apart laterally of the forward end of the vehicle and rigidly interconnected and supported by an axle assembly 38. The axle assembly 38 is in turn supported from leaf springs 40, to which it is shackled as at 42, said leaf springs being in turn supported at each end thereof by pivotal support links 44 to a spider frame generally designated at 46. The spider frame 46, as more clearly shown in Figs. 8, 9, and 10, comprises a rectangular frame consisting of parallel front and rear members 48 and 48' and parallel side members 49 and 49' secured to the front and rear members. The front and rear members 48 and 48' are also interconnected by a pair of truss members 50 which bridge over the parallel side members 49 and 49'. The truss members 50 are secured to frame members 48 and 48' at one end and are secured together such as by welding at their other ends as at 51.

The spider also comprises a plurality of angular brace members 52, six being employed in the disclosed assembly, which are connected to the side frame members 49 and 49' at their lower ends and converge radially upwardly toward a central point within the frame. The upper ends of the brace members are secured to a central hub member 54. The hub member 54 carries a circular cap 56 on its upper face which is provided centrally with a vertically extending steering shaft 58 which projects concentrically upwardly through a tubular post 60 which post projects vertically through and is secured in the hull portion 12 of the vehicle. The shaft 58 rotates in bearings 62 and 64 in rotating engagement with the inner face of the tubular post 60 adjacent its lower and upper ends respectively and a ring-like cap member 66 encloses the lower end of the tubular post 60 concentrically about the shaft 58 locking the lower bearing 62 in a vertical position within the post. The upper end of the tubular post 60 is provided with an enclosing cap member 68 through which the shaft 58 extends and above which said shaft engages one end of a steering arm 70 and through which it projects to rotatably engage and anchor the apex portion of a bell crank 72.

From the aforedescribed construction it is seen that the post 60 through bearings 62 and 64 on the shaft 58 vertically supports the spider frame 46 and hence the leaf springs 40 and the front traction assemblies 26 beneath the tubular post 60 which is rigidly anchored in the hull portion 12 of the vehicle, thus locating the forward traction assembly in a position wherein it serves as a ground engaging support for the forward end of the vehicle.

Within the vehicle is located a manual steering wheel 74 with the conventional steering shaft 76 having geared engagement in a gear box 78 with a worm gear (not shown) on one end of a horizontally extending shaft 80 the end of which shaft, through linkage rods 82 and 84, is connected to the short arm of the bell crank 72 heretofore described. The extended end of the long arm of the bell crank 72 is pivotally secured to a link connector 86 which operably controls a standard hydraulic valve 88 on a conventional hydraulic ram cylinder 90 pivotally anchored, as at 92, at one end thereof to the vehicle frame. Satisfactory results have been obtained with Vickers hydraulic ram and valve assemblies such as models S6-279 and S6-277. Rotation of the steering wheel 74 operates valve 88 from a neutral position to direct pressure fluid to one end or the other of the hydraulic cylinder depending on the direction of movement of the steering wheel. The extended end of the ram of the cylinder 90 is pivotally connected as at 94 to the second end of the arm 70, the first end of which engages shaft 58. The hydraulic ram cylinder is supplied with the usual auxiliary operating equipment such as an oil reservoir and an oil pump operable from the fan belt of the vehicle motor (to be hereinafter described) so that rotation of the steering wheel 74 will, through the operable connections heretofore described, cause complementary control of the hydraulic cylinder valve 88 bringing about appropriate movement of the cylinder ram to move steering arm 70 so as to rotate shaft 58 in one direction or the other providing controlled steering movement of the spider frame 46 and hence the entire forward traction assembly.

For example, if it is desired to steer the vehicle to the left, the steering wheel 74 is turned to the left and link 86 is moved to the right through the worm gear box 78, shaft 80, rod 84, and bell crank 72. Link 86 opens valve 88 so that pressure fluid is directed to the valved end of the hydraulic ram cylinder 90 so that the cylinder moves to the right. As the cylinder moves to the right, it closes valve 88 and also actuates arm 70 to the right which moves the front wheels through spider 46 to the left. Turning the steering wheel to the right reverses this process as pressure fluid is directed to opposite end of the hydraulic ram cylinder 90.

*Power apparatus*

The power apparatus for the amphibious vehicle constituting the present invention, as best seen in Figs. 4, 6, 7, and 11 includes a motor 96 supported within the rearward body enclosure. The motor 96 is so located that the forward end of the motor (disposed rearwardly of the vehicle) is positioned to align the forward end of the crank shaft 98 with the drive shaft 100 of the propeller 22 of the vehicle so that a clutch 102 permits selective engagement and disengagement of a drive connection between the crank shaft of the motor and the propeller.

The rearward end of the motor 96 (disposed forwardly of the vehicle) is provided with a clutch 104 and a transmission 106, the output shaft 108 of which connects into a gear transfer case 110 which is mounted vertically within the vehicle with the lowermost end thereof projecting outwardly through a sealed opening in the bottom of the hull portion 12 thereof. Below the bottom of the hull portion 12 of the vehicle the transfer case 110 is provided with forwardly and rearwardly extending stub shafts 112 and 114 each of which is connected through a universal joint 116 to a drive shaft 118. Each of the forwardly and rearwardly extending drive shafts 118 is connected at their extended ends through a universal joint 120 to a stub shaft 122 which has driving connection through a conventional differential gearing 123 with the paired front or rear axles 125 of the vehicle, as the case may be. Each of the driven axles (front and rear) is provided at each end thereof with a housing 124 which encloses a pair of longitudinally spaced sprocket wheels 126 and 128. In turn, each sprocket wheel supports a driving chain 130 which passes through an enclosed wheel supporting housing 132 to engage a sprocket wheel 134 secured on the inner end of a stub axle 136 on which the wheel 30 is drivably mounted. A housing 138 encloses the sprocket wheel 134 and the stub axle 136 of the wheel, said housing also serving as a support for the stub axle and wheel which in turn is supported by the chain enclosing housing 132 from the main axle assembly supporting the entire traction assembly.

By the foregoing apparatus it is seen that the motor 96 may, through selection operation of the clutches 102 and 104, serve to provide driving power to the propeller 22 of the vehicle for marine use or to the front and rear ground engaging traction assemblies of the vehicle for land use. In addition, a brake assembly is provided for the power apparatus relative to the ground engaging-traction assemblies which brake assembly consists of a stub shaft 140 extending from the gear transfer box 112 and carrying a brake drum thereon which rotates within a conventional brake band 142 which is operable from within the vehicle in a usual manner by structural apparatus not shown.

From the foregoing descriptions, it may now be seen that a new and greatly improved amphibious vehicle has been provided which utilizes a common power source for both the marine as well as the land driving members of the vehicle and which provides a greatly improved steering apparatus for controlling the directional movement of the vehicle on land through controlling the angular positioning of the entire forward traction assembly of the vehicle. The provision of means for steering the entire traction assembly of a vehicle utilizing endless track or tread elements improves the operation and increases the ability of utilization of such a vehicle for travel over ground made impassable to conventional wheel vehicles by reason of snow, water or extremely rough terrain.

Accordingly, having fully described the construction and operation of the amphibious vehicle constituting the present invention and having specifically set forth the numerous objects and advantages which are satisfied by the construction described what is desired to be claimed is:

1. In combination with an amphibious vehicle having a body portion, a steerable ground engaging traction assembly including front and rear aligned paired wheels, an endless traction track engaged about said paired wheels, a frame having rigid support connection with said wheels, a rotatable shaft supporting said frame and extending vertically upwardly into said body portion, a hydraulic ram cylinder within said body portion having operable connection to said pivotal shaft, a hydraulic control valve on said cylinder for selective control of said ram movement, manual steering means within said body portion, and means operably interconnecting said manual steering means and said cylinder control valve; whereby operation of said manual steering means will selectively move said hydraulic ram and thereby rotate said shaft and said frame to control the angularity of said paired wheels relative to the alignment of said body portion.

2. A construction as defined in claim 1 wherein said wheels are rigidly supported from a common axle assembly, and said axle assembly is supported on said frame beneath said vehicle body portion.

3. In combination with a mobile vehicle having a body portion and paired front and rear endless track ground engaging means, steerable mounting means for the front endless tracks comprising a substantially rectangular frame, paired spaced parallel leaf springs carried by opposed members of the rectangular frame, an axle assembly secured to the leaf springs to depend below the rectangular frame midway between said opposed members, a housing carried at each end of the axle assembly, each of said housings supporting a stub axle at each end thereof, a wheel secured to each of the stub axles, means drivably connecting the stub axles to the axle assembly, angular brace members carried by the rectangular frame, said brace members converging radially upwardly from the frame and secured to a vertically extending central hub, and means for rotating said hub to steer the vehicle.

References Cited in the file of this patent

UNITED STATES PATENTS

| | | |
|---|---|---|
| 1,097,807 | Leonard | May 26, 1914 |
| 1,254,446 | Strait | Jan. 22, 1918 |
| 1,619,616 | Ionides | Mar. 1, 1927 |
| 1,724,207 | Lehman | Aug. 13, 1929 |
| 1,804,816 | Shelton | May 12, 1931 |
| 1,975,794 | Knox et al. | Oct. 9, 1934 |
| 2,110,214 | Flowers | Mar. 8, 1938 |
| 2,169,916 | Keeler | Aug. 15, 1939 |
| 2,291,626 | Huber | Aug. 4, 1942 |
| 2,374,196 | Harbers | Apr. 24, 1945 |
| 2,532,785 | Richter | Dec. 5, 1950 |
| 2,638,998 | Rockwell | May 19, 1953 |